US008843932B2

(12) United States Patent
Sohi et al.

(10) Patent No.: US 8,843,932 B2
(45) Date of Patent: Sep. 23, 2014

(54) SYSTEM AND METHOD FOR CONTROLLING EXCESSIVE PARALLELISM IN MULTIPROCESSOR SYSTEMS

(75) Inventors: Gurindar S. Sohi, Madison, WI (US); Srinath Sridharan, Madison, WI (US); Gagan Gupta, Fitchburg, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 683 days.

(21) Appl. No.: 13/005,333

(22) Filed: Jan. 12, 2011

(65) Prior Publication Data

US 2012/0180062 A1 Jul. 12, 2012

(51) Int. Cl.
*G06F 9/46* (2006.01)
*G06F 9/50* (2006.01)

(52) U.S. Cl.
CPC ........ *G06F 9/5066* (2013.01); *G06F 2209/508* (2013.01)
USPC ............ 718/104; 717/127; 717/128; 717/130

(58) Field of Classification Search
None
See application file for complete search history.

(56) References Cited

U.S. PATENT DOCUMENTS

| | | | | |
|---|---|---|---|---|
| 5,410,696 A | * | 4/1995 | Seki et al. | 717/149 |
| 5,671,402 A | * | 9/1997 | Nasu et al. | 712/227 |
| 5,752,030 A | | 5/1998 | Konno et al. | |
| 5,978,830 A | * | 11/1999 | Nakaya et al. | 718/102 |
| 6,341,371 B1 | * | 1/2002 | Tandri | 717/158 |
| 7,734,952 B1 | | 6/2010 | Hoffman et al. | |
| 7,992,151 B2 | * | 8/2011 | Warrier et al. | 718/104 |
| 8,370,493 B2 | * | 2/2013 | Sirota et al. | 709/226 |
| 8,448,140 B2 | * | 5/2013 | Isshiki et al. | 717/124 |
| 8,473,724 B1 | * | 6/2013 | Kenville et al. | 712/229 |
| 2004/0268000 A1 | | 12/2004 | Barker et al. | |
| 2005/0034002 A1 | | 2/2005 | Flautner | |
| 2006/0101464 A1 | * | 5/2006 | Dohrmann | 718/100 |
| 2007/0169057 A1 | * | 7/2007 | Silvera et al. | 717/160 |
| 2008/0288746 A1 | * | 11/2008 | Inglett et al. | 712/20 |
| 2009/0125705 A1 | * | 5/2009 | Orii | 712/220 |
| 2009/0164399 A1 | | 6/2009 | Bell, Jr. et al. | |
| 2010/0070740 A1 | * | 3/2010 | Allen et al. | 712/30 |
| 2010/0131931 A1 | * | 5/2010 | Musuvathi et al. | 717/128 |
| 2010/0162216 A1 | * | 6/2010 | Bell et al. | 717/128 |
| 2010/0306752 A1 | * | 12/2010 | Bordelon et al. | 717/149 |
| 2011/0161610 A1 | * | 6/2011 | Gustafsson et al. | 711/163 |
| 2011/0161978 A1 | * | 6/2011 | Jang et al. | 718/104 |

OTHER PUBLICATIONS

Culler, D.E., et al., Resource Requirements of Dataflow Programs, SIGARCH Comput. Archit. News 16, (May 2, 1988), pp. 141-150, IEEE, New York, New York, USA.

Lee, Janghaeng, et al., Thread Tailor: Dynamically Weaving Threads Together for Efficient, Adaptive Parallel Applications, International Symposium on Computer Architecture (ISCA), Jun. 19-23, 2010, ISCA, Cary, North Carolina.

(Continued)

*Primary Examiner* — Emerson Puente
*Assistant Examiner* — Hiren Patel
(74) *Attorney, Agent, or Firm* — Boyle Fredrickson, S.C.

(57) ABSTRACT

Execution of a computer program on a multiprocessor system is monitored to detect possible excess parallelism causing resource contention and the like and, in response, to controllably limit the number of processors applied to parallelize program components.

15 Claims, 4 Drawing Sheets

(56) References Cited

OTHER PUBLICATIONS

Suleman, M. Ater, et al., Feedback-driven Threading: Power-Efficient and HighPerformance Execution of Multi-Threaded Workloads on CMPs. In Proceedings of the 13th International Conference on Architectural Support for Programming Languages and Operating Systems, ASPLOS XIII, 2008, pp. 277-286,ACM, New York, NY, USA.

Jung, Changhee, et al., Adaptive Execution Techniques for SMT Multiprocessor Architectures, In Proceedings of the tenth ACM SIGPLAN symposium on principles and practice of parallel programming, Jun. 15-17, 2005, pp. 236-246, ACM, New York, NY, USA.

Dusseau, Andrea C., et al., Effective Distributed Scheduling of Parallel Workloads, SIGMETRICS, Perform. Eval. Rev. 24, May 1, 1996, pp. 25-36, ACM, New York, NY, USA.

Ebrahimi, E., et al., Fairness via Source Throttling: a Configurable and High-Performance Fairness Substrate for Multi-Core Memory Systems, In Proceedings of the Fifteenth Edition of ASPLOS on Architectural support for Programming Languages and Operating Systems, ASPLOS 2010, pp. 335-346, ACM, New York, NY, USA.

Illikkal, R. et al., Pirate: Qos and Performance Management in CMP Architectures,SIGMETRICS Perform. Eval. Rev., 37:3-10, Mar. 2010, ACM, New York, NY, USA.

Mutlu, O., et al., Parallelism-Aware Batch Scheduling: Enhancing Both Performance and Fairness of Shared Dram Systems, In Proceedings of the 35th Annual International Symposium on Computer Architecture, ISCA '08, pp. 63-74, Washington, DC, USA, 2008. IEEE Computer Society, IEEE, New York, New York, USA.

Zahorjan, J., et al, The Effect of Scheduling Discipline on Spin Overhead in Shared Memory Parallel Systems, Parallel and Distributed Systems, IEEE Transactions on, vol. 2, No. 2, pp. 180-198, Apr. 1991, IEEE, New York, New York, USA.

Ousterhout, J. K., Scheduling Techniques for Concurrent Systems, Proceedings of Third International Conference on Distributed Computing Systems, 1982, pp. 22-30, IEEE, New York, New York, USA.

Karlin, Anna R., et al., Empirical studies of Competitive Spinning for a Shared-Memory Multiprocessor. In Proceedings of the Thirteenth ACM Symposium on Operating systems Principles (SOSP 1991), pp. 41-55, ACM, New York, NY, USA.

Gupta, Anoop, et al., The Impact of Operating System Scheduling Policies and Synchronization Methods of Performance of Parallel Applications. In Proceedings of the 1991 ACM SIGMETRICS Conference on Measurement and Modeling of Computer Systems, 1991, pp. 120-132, ACM, New York, NY, USA.

Kontothanassis, Leonidas, et al., Using scheduler information to achieve optimal barrier synchronization performance. In Proceedings of the fourth ACM SIGPLAN symposium on Principles and practice of parallel programming, 1993, pp. 64-72, ACM, New York, NY, USA.

Feitelson, Dror G., et al., Gang scheduling performance benefits for Fine-Grain Synchronization, Journal of Parallel and Distributed Computing, vol. 16, Issue 4, Dec. 1992, pp. 306-318, Academic Press, Inc., Elsevier, Maryland Heights, MO.

McCann, Cathy, et al., Processor Allocation Policies for Message-Passing Parallel Computers, SIGMETRICS Perform. Eval. Rev. 22, (May 1, 1994), pp. 19-32, ACM, New York, NY, USA.

Tucker, A., et al., 1989. Process Control and Scheduling Issues for Multiprogrammed Shared-Memory Multiprocessors. In Proceedings of the twelfth ACM symposium on Operating Systems Principle, 1989, pp. 159-166, ACM, New York, NY, USA.

Curtis-Maury, et al., Online Power-Performance Adaptation of Multithreaded Programs Using Hardware Event-Based Prediction, In proceedings of the 20th annual international conference on Supercomputing, ICS '06 (2006), pp. 157-166, ACM, New York, New York.

Curtis-Maury, et al., Prediction Models for Multi-Dimensional Power-Performance Optimization on Many Cores, In proceedings of the 17th international conference on parallel architectures and compilation techniques, PACT '08 (2008), pp. 250-259, ACM New York, New York.

Li, et al., Hybrid MPI/OpenMP Power-Aware Computing, In Parallel Distributed Processing (IPDPS), 2010 IEEE International Symposium, Apr. 2010, pp. 1-12.

Li, et al., Power-Performance Implications of Thread-Level Parallelism on Chip Multiprocessors, In Performance Analysis of Systems and Software, ISPASS 2005, IEEE International Symposium, Mar. 2005, pp. 124-134.

Li, et al., Dynamic Power-Performance Adaptation of Parallel Computation on Chip Multiprocessors, In High-Performance Computer Architecture, 2006, The Twelfth International Symposium, Feb. 2006, pp. 77-87.

Raman, et al., Parallelism Orchestration Using DoPE: the Degree of Parallelism Executive, SIGPLAN Not., 46, Jun. 2011, pp. 26-37.

Bhadauria, et al., An Approach to Resource-Aware Co-Scheduling for CMPs, In proceedings of the 24th ACM International Conference on Supercomputing (ICS '10), (2010), pp. 189-199, ACM, New York, New York.

\* cited by examiner

SYSTEM AND METHOD FOR CONTROLLING EXCESSIVE PARALLELISM IN MULTIPROCESSOR SYSTEMS

STATEMENT REGARDING FEDERALLY SPONSORED RESEARCH OR DEVELOPMENT

This invention was made with government support under 0963737 awarded by the National Science Foundation. The government has certain rights in the invention.

BACKGROUND

The present invention relates to the execution of computer programs in parallel on multiple processors and in particular to a system controlling parallelization of computer programs.

Improvements in software performance have been realized by improved processor designs, for example, faster clock speeds, multiple instruction issue, and speculative execution techniques. Such performance improvements have the advantage of being completely transparent to the program generator (for example, a human programmer, compiler, or other program translator). However, achieving these benefits depends on the continuing availability of improved processors.

Parallelization offers another avenue for software performance improvement by dividing the execution of a software program amongst multiple processors that can run simultaneously. As more performance is required, more processors may be added to the system, ideally resulting in attendant performance improvement. Computer manufacturers have turned to designing processors composed of multiple cores, each core comprising circuitry (e.g., a CPU) necessary to independently perform arithmetic and logical operations. In many cases, the cores also support multiple execution contexts, allowing more than one program to run simultaneously on a single core (these cores are often referred to as multi-threaded cores and should not be confused with the software programming technique of multi-threading). The term "processor" as used herein will generally refer to an execution context of a core.

A core is typically associated with a cache and an interconnection network allowing the sharing of common memory among the cores; however, other "shared memory" architectures may be used, for example those providing exclusive memories for each processor with a communication structure. These multi-core processors often implement a multiprocessor on a single chip and multiple chips of multi-core processors are typically used to build a larger multiprocessor computer. Due to the shift toward multi-core processors, parallelization is supplanting improved single processor performance as the primary method for improving software performance.

Improved execution speed of a program using a multiprocessor computer depends on the ability to divide a program into portions that may be executed in parallel on the different processors. Parallel execution in this context requires identifying portions of the program that are independent such that they do not simultaneously operate on the same data. Of principal concern are portions of the program that may write to the same data, "write-write" dependency, and portions of the program that may implement a reading of data subsequent to a writing of that data, "read-write" dependency, or a writing of data subsequent to a reading of the data, "write-read" dependency. Errors can result if any of these reads and writes change in order as a result of parallel execution.

Some computer programs are relatively simple to execute in parallel, for example those which have portions which can be ensured to always operate on completely disjoint data sets, for example as occurs in some server applications and types of scientific computation. During execution, these different portions may be assigned to different queues for different processors by a master thread evaluating the relative work load of each processor and pending program threads.

A broader class of programs cannot be divided into portions statically known to operate on disjoint data. Many current programs are written using a sequential programming model, expressed as a series of steps operating on data. This model provides a simple, intuitive programming interface because, at each step, the generator of the program (for example, the programmer, compiler, and/or some other form of translator) can assume the previous steps have been completed and the results are available for use. However, the implicit dependence between each step obscures possible independence among instructions needed for parallel execution. To statically parallelize a program written using the sequential programming model, the program generator must analyze all possible inputs to different portions of the program to establish their independence. Such automatic static parallelization works for programs which operate on regularly structured data, but has proven difficult for general programs. In addition, such static analysis cannot identify opportunities for parallelization that can be determined only at the time of execution when the data being read from or written to can be positively identified.

U.S. patent application Ser. No. 12/543,354 filed Aug. 18, 2009; U.S. patent application Ser. No. 12/858,907 filed Aug. 18, 2010; and U.S. patent application Ser. No. 12/882,892 filed Sep. 15, 2010 (henceforth the "Serialization" patents) all assigned to the same assignee as the present invention and all hereby incorporated by reference, describe systems for parallelizing programs, written using a sequential program model, during an execution of that program.

In these inventions, a master thread takes each computational operation and assigns it to a different processor queue according to a set of rules intended to prevent data access conflicts. By performing the parallelization during execution of the program, many additional opportunities for parallelization may be exploited beyond those which may be identified statically.

BRIEF SUMMARY

In certain cases, increased parallel execution of a program can decrease the program execution speed, for example, as the result of contention between different threads for scarce resources such as memory, interconnection bandwidth, locks, or the like. This can be a particular problem for programs that may be executed on a wide variety of different hardware platforms that cannot be accommodated at the time of program generation. The present invention provides a system and method for controlling parallel execution based on a measurement of an execution of at least a portion of the program to evaluate the functional relationship between execution speed and parallelism. By controlling the amount of dynamic parallelism, program execution time, program execution throughput, energy or power consumed, usage of cache, memory, or interconnection resources, or other such metrics related to program execution speed, can be optimized.

In one embodiment, the invention provides a method of executing a program on a computer having multiple processors capable of executing portions of the program in parallel. This embodiment may include the steps of: (a) measuring the execution of a portion of the program with a different numbers of processors executing the program in parallel to provide at least one value related to a speed of execution of the program on a computer; and (b) adjusting the number of processors executing the program in parallel according to at least one value, including, at times, reducing the number of processors executing the program to change the value.

It is thus a feature of at least one embodiment of the invention to provide a method of controlling the parallel execution of a program on a multiprocessor system that may be susceptible to excess parallelism. It is another object of the invention to operate with an arbitrary hardware platform by adaptively adjusting parallelism according to actual measured performance.

The measure of execution of the program may determine a speed of execution of at least a portion of the program.

It is thus a feature of at least one embodiment of the invention to provide a simple method of assessing program execution speed. Measurement of execution speed of a portion of the program may serve as a proxy for the entire program having multiple different portions or may be used to optimize only the measured portion.

The derived value may be a function of a number of processors executing the program in parallel.

It is thus a feature of at least one embodiment of the invention to provide a control variable that can be used to balance execution speed against possible cost of using additional processors.

The derived value may be a function of time of the measurement.

It is thus a feature of at least one embodiment of the invention to provide a control variable that reacts to trends in execution speed.

The method may include the step of associating computational operations of the program with processors during an execution of the program and steps (a) and (b) may occur during the execution of the program.

It is thus a feature of at least one embodiment of the invention to accommodate a variety of different types of resource contention, in a variety of different types of processors without prior knowledge.

The method may repeat (a) and (b) during execution of the program.

It is thus a feature of at least one embodiment of the invention to provide a system that may adapt to changes in the contention over time as the program is subject to different environmental conditions or executed with different other program elements.

The program may include at least one computational operation that may be executed in parallel on the processors and the step of measuring execution of the program may measure an execution of the computational operation on at least one processor.

It is thus a feature of at least one embodiment of the invention to provide a simple method of measuring processor speed that measures as little as a single parallelizable program element.

The computational operation may be measured as it is executed on at least two different numbers of processors in parallel.

It is thus a feature of at least one embodiment of the invention to use multiple data points to provide more sophisticated control of processor number limits.

The timing of the execution of the computational operation may monitor an instruction counter near the start and completion of the computational operation.

It is thus a feature of at least one embodiment of the invention to provide a simple and rapid method of timing computational operations using standard hardware.

The value may indicate a trend in execution time of the task.

It is thus a feature of at least one embodiment of the invention to provide an anticipation of possible contention problems before they result in performance degradation permitting improved real time, dynamic control.

The program may include multiple different computational operations that may be executed in parallel on the processors and the monitoring may measure the execution of a given computational operation on at least one processor when the given computational operation is executed in parallel with different numbers of other computational operations.

It is thus a feature of at least one embodiment of the invention to provide an ability to optimize the execution of multiple different computational operations.

The monitoring may include the steps of: (i) executing a computational operation on only a single processor to obtain a baseline measure; (ii) comparing an execution measure of the computational operation during execution on more than one processor to the baseline measure.

It is thus a feature of at least one embodiment of the invention to automatically identify thresholds for detecting program speed degradation. Establishing a baseline for a computational operation allows the system to work freely with a variety of different computational operations that have otherwise not been pre-characterized.

The adjusting of the number of processors may compare the value related to the speed of execution to at least two ranges to: (1) increase the number of processors executing the program when the value is in the first range, and (2) decrease the number of processors executing the program when the value is in the second range.

It is thus a feature of at least one embodiment of the invention to provide a simple control algorithm that can be easily designed to ensure stable control of processor numbers.

The adjusting of the processor numbers may further compare the value to a third range to leave the number of processors executing the program unchanged when the value is in the third range.

It is thus a feature of at least one embodiment of the invention to limit unnecessary "hunting" in the selection of the number of processors that may cause the process to operate in a non-optimal manner for a significant fraction of time.

These particular features and advantages may apply to only some embodiments falling within the claims and thus do not define the scope of the invention. The following description and figures illustrate a preferred embodiment of the invention. Such an embodiment does not necessarily represent the full scope of the invention, however. Furthermore, some embodiments may include only parts of a preferred embodiment. Therefore, reference must be made to the claims for interpreting the scope of the invention.

DETAILED DESCRIPTION

Figure 1:
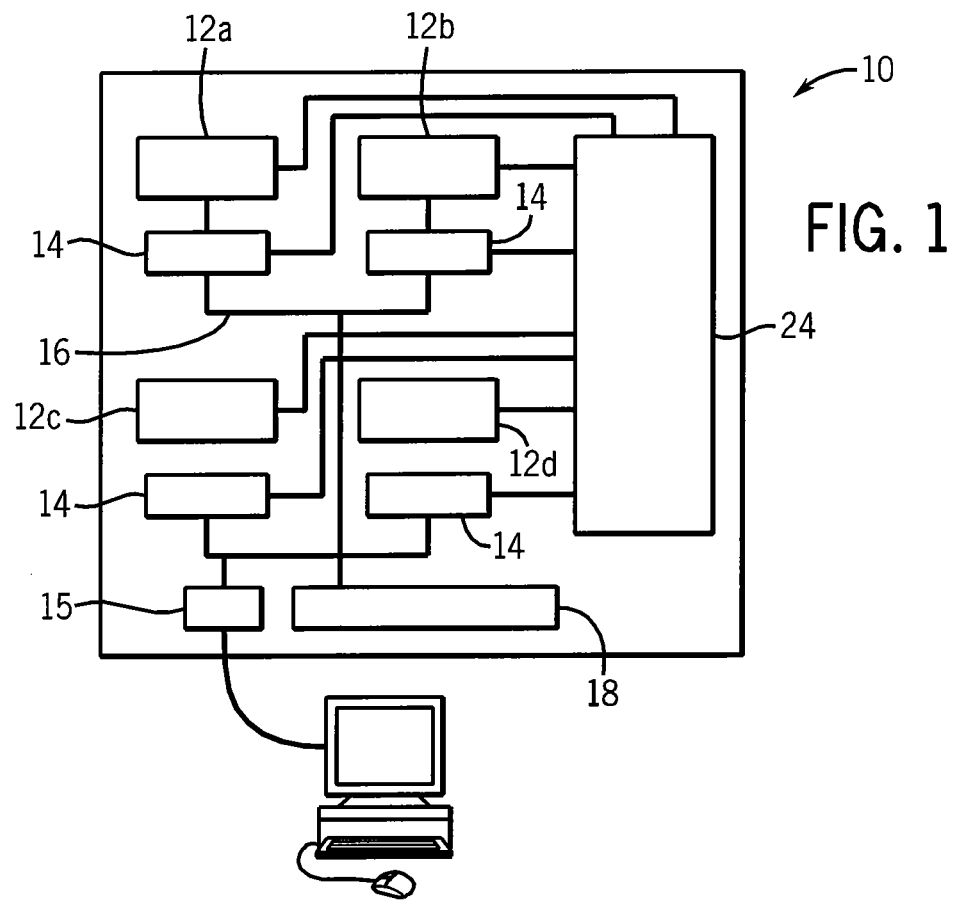
FIG. 1 is a simplified representation of the physical architecture of a multiprocessor system having four processors and being one type of multiprocessor system suitable for implementation of the present application.

Referring now to FIG. 1, a multiprocessor system 10 may include, for example, four processors 12a-12d each associated with a local memory 14 and communicating on an interconnection network structure 16 with shared memory 18. It will be understood that the present application applies to cases where the local memory 14 and shared memory 18 are managed automatically by hardware (i.e., local memory 14 is a cache), as well as cases where software must explicitly perform transfers among shared memory 18 and local memories 14. It will be further understood that shared memory 18 may in turn communicate with additional external memory (not shown) or in fact may be comprised totally of local memories 14 through communication protocols. Each of the processors 12 may also communicate with common control circuitry 24 providing coordination of the processors 12 as is understood in the art.

Although the present application is described with respect to a multiprocessor implemented as separate processors communicating with shared memory, it will be understood that the term multiprocessor includes any type of computer system providing multiple execution contexts, including, but not limited to, systems composed of multi-threaded processors, multi-core processors, heterogeneous computational units, or any combination thereof.

Figure 2:
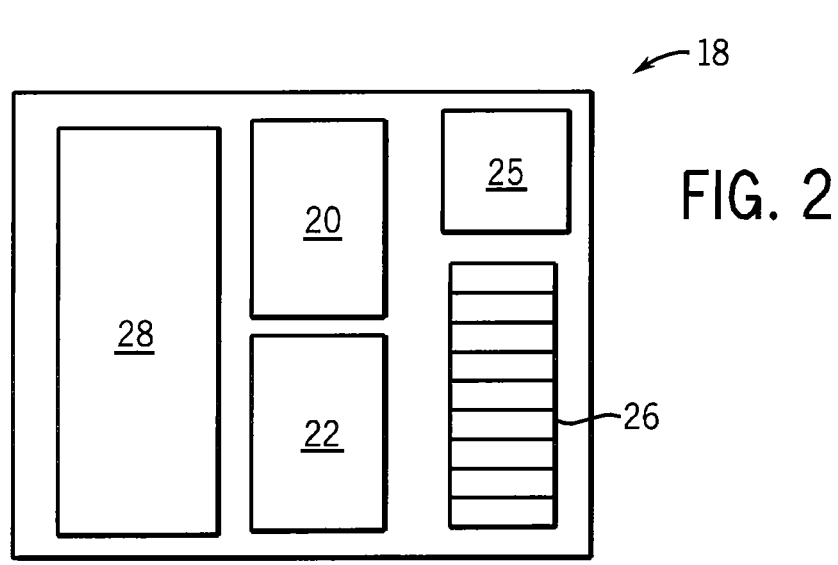
FIG. 2 is a simplified representation of the software elements of one embodiment of the present invention including a modified sequential model program, associated libraries and queue structures.

Referring now to FIG. 2, the shared memory 18 may hold one or more sequential model programs 20, modified accordingly for parallel execution, and program data 22 accessed via the program 20 during execution. Shared memory 18 may further include runtime library 25 possibly providing class specifications (i.e., object prototypes), pre-defined serializers (when serialization is used), generators for ordered communication structures (e.g., queues), and code to implement the runtime operations of a master thread and a performance monitoring system, described in further detail herein below. The shared memory 18 may also include queues 26 as will be described below, and an operating system 28 providing execution context for the above as will generally be understood in the art.

Figure 3:
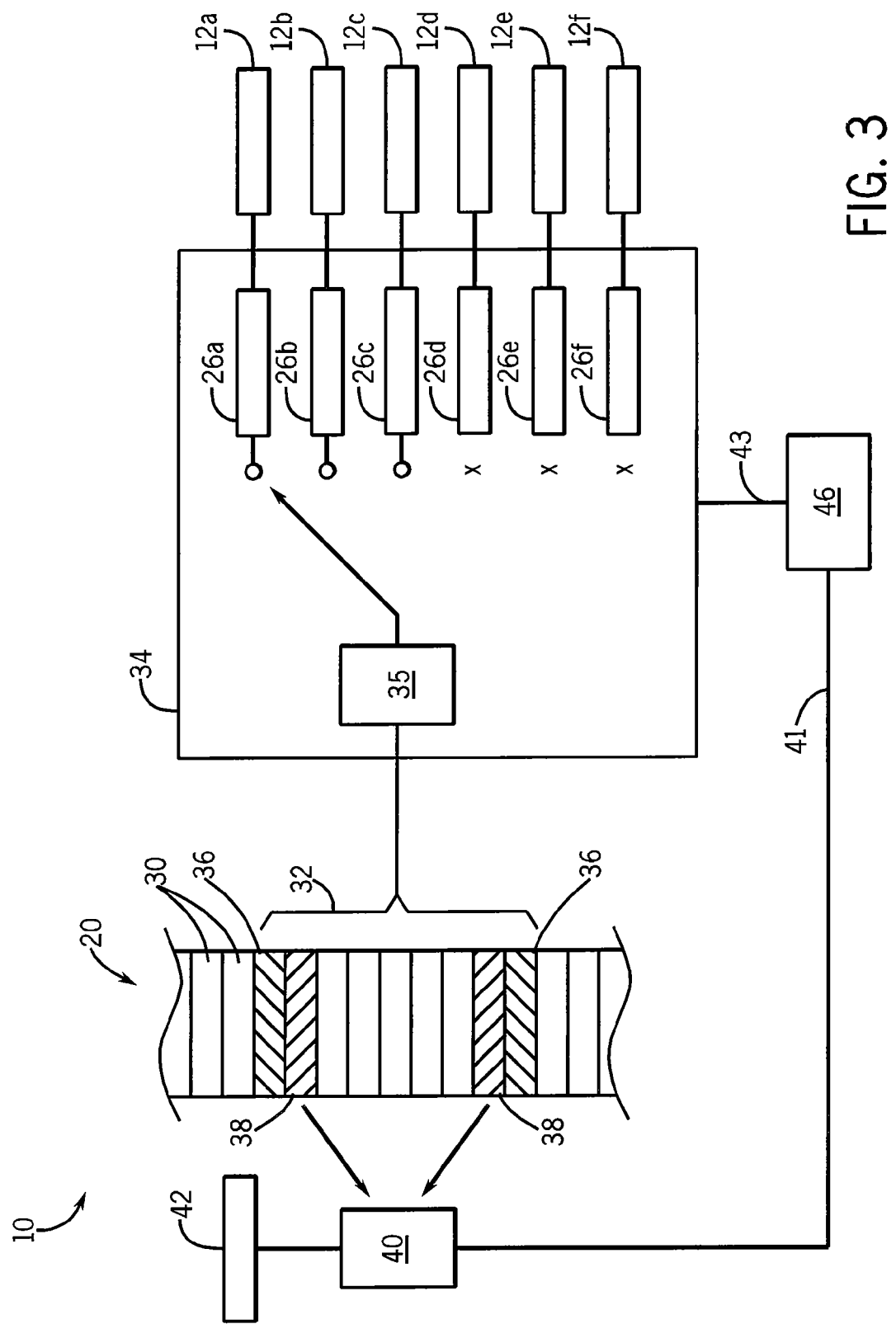
FIG. 3 is a logical diagram of one embodiment of a system executing the sequential model program of FIG. 2 comprised of computational operations each including groups of instructions identified for parallel execution and the allocation of the computational operations to different queues in a queue order by a master thread for execution on different processors.

Referring now to FIG. 3, in one embodiment, a sequential model program 20 may comprise multiple computer executable instructions 30 collected in computational operations 32. The sequential model program 20 thus may represent a program prepared using standard languages to logically execute serially on a single processor. The computational operations 32 may be, for example, program functions operating on particular data or software objects that may be instantiated with an instance number to execute on data associated with that object and instance number. Such methods can be identified for parallelization during run time. The invention also contemplates that the methods may be statically parallelizable functions or the like or may be different software applications.

The sequential model program 20 may be read by a master thread 34 having allocation routine 35 allocating the computational operations 32 to different execution queues 26a-26f each associated with a different processor 12a-12f. This allocation can be performed based on determinations made during run-time as described in any of the above-cited Serialization cases (referring to corresponding queues 26 in those cases). In this embodiment, each computational operation 32 may be delimited with serialization instructions 36 which identify the computational operation 32 as being amenable to parallel execution and optionally provide instructions as to how that allocation to different queues 26 should be performed as described in the above referenced Serialization patents. The master thread 34 may use these instructions and their location to perform the allocation process.

Alternatively, the master thread 34 may allocate the computational operations 32 according to static or ex ante decisions about executing computational operations 32 known to be conditionally or unconditionally parallelizable, dividing them among the queues 26 in some fashion. In either case, the number of computational operations that are assigned to the processors for parallel execution at a given time may be less than, equal to, or greater than the number of available processors.

In either case, in a first embodiment, the present invention may also provide for execution-monitoring operations 38 before and after the instructions of the computational operation 32. It will be understood that these execution-monitoring operations 38 like the serialization instructions 36 need not be physically in-line with the computational operations 32 but are effectively executed as if that were the case. It will be further understood that these execution-monitoring operations 38 may be implemented in a variety of ways such as software instructions or firmware/hardware operations or combinations thereof.

The execution-monitoring operations 38 may invoke a performance benchmarking routine 40 that, in one embodiment, may read and store a processor cycle counter 42 of the multiprocessor system 10 at the beginning and end of the computational operation 32. The difference between these values thus reflects the time it takes to execute the instructions of the computational operation. As will be understood to those of ordinary skill in the art, a processor cycle counter 42 is a standard hardware element that increments substantially monotonically with each processor clock cycle of the multiprocessor system 10. In this respect, it measures time and thus the time it takes to complete the instructions executed by each of the processors 12. The benchmarking routine 40 may be triggered or executed by the processor 12 executing the instrumented computational operations 32 and thus measures actual processing time and not the time it takes for the master thread 34 to allocate these computational operations 32 to a particular queue 26 or other overhead of the parallelization process.

As noted, the difference between the values of the processor cycle counter 42 taken by the benchmarking routine 40 provides a good approximation of the time necessary to execute the computational operation 32 on a processor 12 and may be output directly as a measure 41 reflecting generally the performance of the multiprocessor system 10. The present inventors have determined that this measurement is reasonably accurate even if the multiprocessor system 10 allows out of order instruction execution (for example speculative execution) and, generally, despite time slicing operations of the operating system which are far coarser than the times deduced by the benchmarking routine 40.

In other embodiments, the benchmarking routine 40 may read and store other values to measure program execution performance, including, but not limited to, values related to cache misses, cache usage, memory traffic, resource utilization, and the like. Such values could be maintained in counters in hardware, in memory, or in combinations thereof.

The benchmarking routine 40 provides its measures 41 indicating the performance of the multiprocessor system 10 in executing the computational operation 32 to a thread controller 46. The thread controller 46 may use this measure 41 to derive a control value that may be used to control the number of different queues 26 that will be available to the master thread 34 and the allocation routine 35 via a processor limit value 43 communicated to the master thread 34. Thus, for example, if there are six possible execution queues 26a-26f each associated with a processor 12a-12f available for parallel execution, the thread controller 46 may limit the available processors 12 and queues 26 to three queues 26a-26c and processors 12a-12c only.

Generally, the thread controller 46 may increase or decrease the processor limit value 43 and hence the number of processors 12 that may be used for parallel execution (within the limitations imposed by the available number of processors 12) according to the measures 41 received from the benchmarking routine 40. In this way the degree to which parallel execution is permitted may be linked to actual performance increases in the multiprocessor system 10 caused by parallel execution. In this regard, a single processor limit value 43 may apply to all computational operations 32; however, the present invention also contemplates that different processor limit values 43 may be associated with different computational operations 32 or groupings of computational operations 32, for example.

Figure 4:
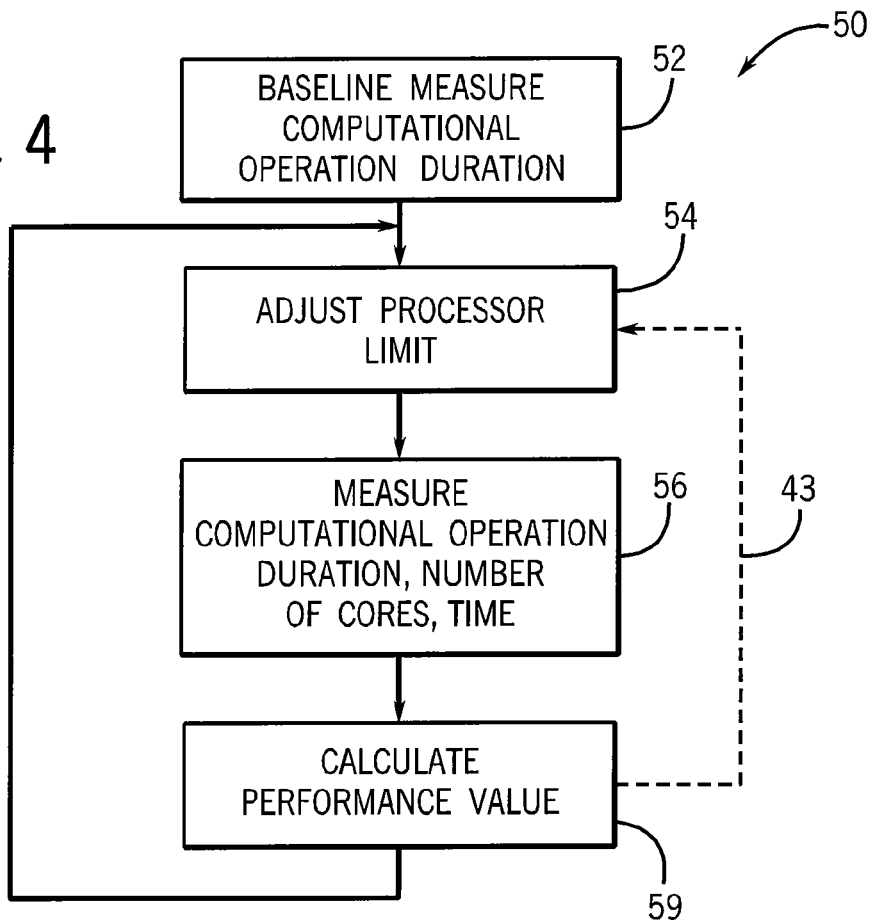
FIG. 4 is a flow chart showing steps implemented by an embodiment of the present invention in controlling the number of processors used for parallel processing.

Referring now to FIG. 4, more specifically, the benchmarking routine 40 and thread controller 46 may operate to execute a sequence of steps 50 (implemented as software, firmware, or the like) that may first obtain a baseline task measure for a given computational operation 32 as indicated by process block 52. During this benchmarking procedure, the thread controller 46 may provide a processor limit value 43 of one for this and all other potentially interfering computational operations 32, limiting the number of available queues 26 and processors 12 to a single queue 26 and processor 12, essentially reverting to a serial execution architecture. The measures provided by the benchmarking routine 40 thus represent a largely contention free execution of the computational operation 32 without interference from other computational operations 32 of the same program 20 (though there may be contention from other programs being simultaneously executed on the multiprocessor). Multiple benchmarking executions of a computational operation 32 may be completed to develop an average benchmarking value if desired. This benchmarking value may be stored as a baseline value identified to the particular computational operation 32 in a table or the like.

At succeeding process block 54, the number of processors 12 that will be made available for execution of the computational operation 32 by the allocation routine 35 may be adjusted. This adjustment may initially be to increase the number of available processors 12 by one so that the particular computational operation 32 may be executed in parallel by two processors 12. At later executions of process block 54, the processor limit value 43 may be adjusted up or down depending on program execution performance.

At succeeding process block 56 additional measures of the execution of a computational operation 32 may be made by the benchmarking routine 40 recording new execution duration measures 41 for the computational operation 32 under different degrees of parallel execution. The relative time of the measurement of the executions (in absolute time or relative to previous and later measurements of that computational operation), and the number of processors 12 actively processing the particular computational operation 32 or other computational operations 32 at the time of measurement, or the relative change in this number of processors 12 since the previous measurement, or other like measures or combinations thereof may also be recorded.

At process block 59 this recorded data may be used to calculate a performance control value reflecting the overall performance of the multiprocessor system 10. In the case where only a single computational operation 32 is being parallelized, the control value directly indicates program performance, otherwise this execution measure serves as a proxy for that performance, for example, in the case where there are other unmeasured computational operations, or a part of the measure of processor performance where there are multiple different computational operations 32 that are being measured and optimized. The control value computed at process block 59 may combine the data collected from multiple measures 41 from multiple computational operations 32 to obtain a better understanding of the overall processor performance of the multiprocessor system 10.

The control value may be applied against a threshold to produce the processor limit value 43 (indicated by dashed line) to process block 54 to control the number of processors 12. Generally, so long as the aggregate performance of the multiprocessor system 10 in executing the program is increasing, the processor limit value 43 can increase; otherwise, the processor limit value 43 may be held the same or decreased as will be described below.

The process 50 may then return to process block 54 for that adjustment process and occasionally, or optionally, to process block 52 to repeat the benchmarking operation periodically.

In one embodiment, the calculation of control value at process block 59 may use the following equations calculated at successive times $t_i$:

$$\text{rate\_of\_increase}(t_i) = \frac{\left(\begin{array}{c}\text{actual\_execution\_measure}(t_i) - \\ \text{baseline\_execution\_measure}\end{array}\right)}{\Delta \text{Num\_tasks}(t_i - t_{i-1})} \quad (1)$$

where $\Delta \text{Num\_tasks}(t_i - t_{i-1})$ is the dynamic number of computational tasks executed between successive times, actual_execution_measure($t_i$) is the current measure 41 provided by the benchmarking routine 40, and baseline_execution_measure is the baseline also provided by the benchmarking routine 40.

$$\text{differential\_rate}(t_i) = \text{rate\_of\_increase}(t_i) - \text{rate\_of\_increase}(t_{i-1}) \quad (2)$$

$$\text{rate\_factor}(t_i) = \frac{\text{rate\_of\_increase}(t_i)}{\text{rate\_of\_increase}(t_{i-1})} \quad (3)$$

$$\text{diff\_factor}(t_i) = \frac{\text{differential\_rate}(t_i)}{\text{differential\_rate}(t_{i-1})} \quad (4)$$

The rate_factor($t_i$) and cliff_factor($t_i$) may be used to adjust the processor limit value 43 used for parallel execution according to the following Table I:

TABLE I

| rate_factor($t_i$) | diff_factor($t_i$) | Processor Limit Value |
|---|---|---|
| Low | Low | Increment the number of processors aggressively |
| High | Low | Increment number of processors conservatively |
| Low | High | Increment number of processors conservatively |
| High | High | Decrement number of processors |

In the above Table I, the values of High and Low are with respect to a predetermined threshold value (e.g., 1). Aggressive incrementing of the number of processors may be implemented by changing the increment size, for example incrementing by two or more processors at a time, while the conservative incrementing of the number of processors may use an increment size of one. Alternatively, aggressive incrementing of the number of processors may be implemented by adjusting on a quicker cycle than the cycle used with conservative incrementing.

EXAMPLE I

Figure 5:
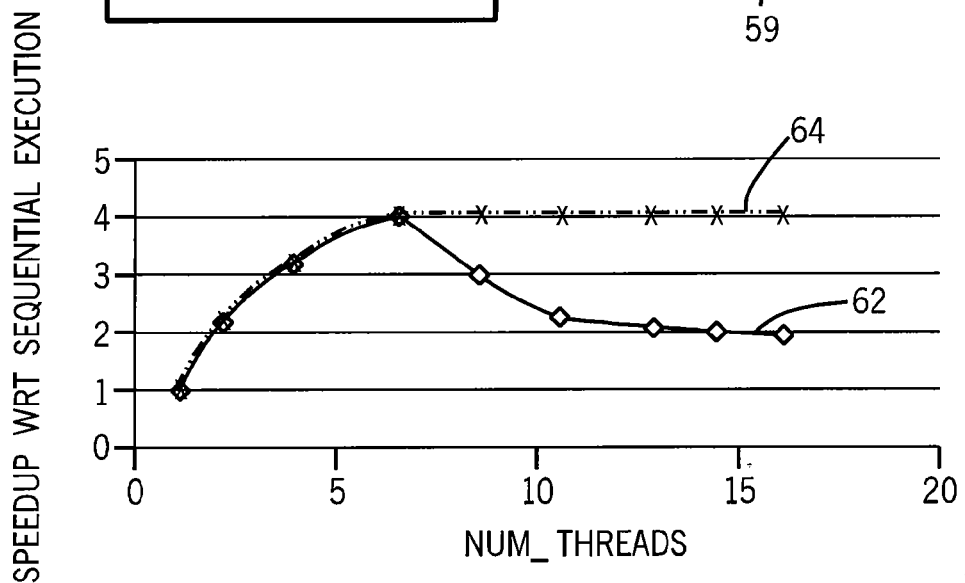
FIG. 5 is a chart showing results of an experiment of program performance as a function of the number of parallel threads showing a decrease in program execution speed as the number of threads rises above approximately six and showing an elimination of this decline in an execution with an embodiment of the present invention.

Referring now to FIG. 5, an experiment without the invention and with an embodiment of the present invention was performed with a memcpy( ) application which copied a block of memory from one location to another. Solid plot line 62 shows performance on a machine having 8 processor sockets with a 4-core processor in each socket, for a total of 4×8=32 total processing cores, or processors, without implementation of the parallelism controlling of the present invention while dashed plot line 64 shows performance on the same machine with the parallelism controlling of an embodiment of the present invention.

Figure 6:
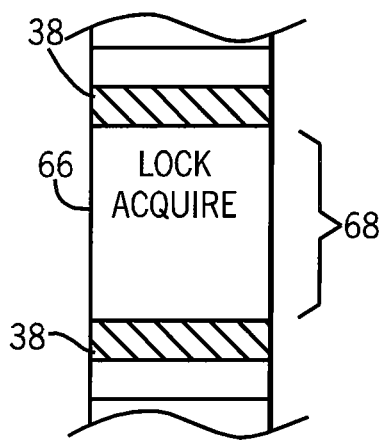
FIG. 6 is a fragmentary view of the sequential model program of FIG. 3 instrumented to detect lock contention problems.

Referring now to FIG. 6, the benchmarking routine 40 need not be limited to measurement of execution of the computational operations 32 but may alternatively or in addition look at other proxies for performance of the multiprocessor system 10 in executing the program 20. For example, execution-monitoring operations 38 may be placed before and after a lock acquire instruction 66 for programs using locks for accessing data shared with other threads or computational operations 32. A value deduced from the difference between the processor cycle counter values captured in this embodiment may indicate lock contention time 68 (e.g. the time required to acquire the lock) and a high value may indicate detrimental competition between threads.

Figure 7:
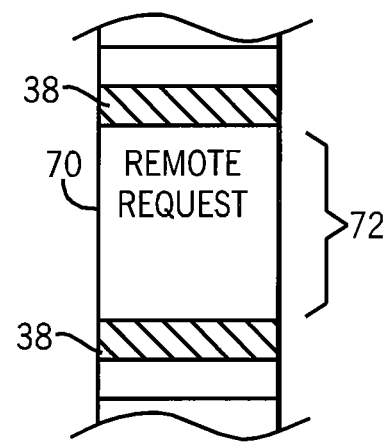
FIG. 7 is a figure similar to that of FIG. 6 showing the sequential program model instrumented to detect memory or interconnect bandwidth contention problems.

Alternatively, and referring to FIG. 7, execution-monitoring operations 38 may be placed before and after a remote request instruction 70 indicating completion of the instruction 70 to determine the time 72 required to satisfy the remote request. This approach may allow the value to reflect memory bottlenecks or other resource limitations such as cache size bottlenecks or interconnection bandwidth limitations.

It will be understood that different embodiments of the benchmarking routine 40 may collect different values for a measure of execution, for example, minimum, maximum, average, or instantaneous values, or combinations thereof.

The environment in which a particular computational operation 32 will execute may be constantly changing in many applications where multiple different computational operations 32 from the same program 20 may be run concurrently and/or multiple different programs may be run concurrently. In these cases, repetition of the steps of 54, 56, and 59 of FIG. 4 can be used to create a constantly evolving adjustment of the processor limit value 43 linked to each computational instruction.

It will be understood that more sophisticated prediction and control loops may be developed to address this dynamic environment limited primarily by the amount of memory dedicated to storing the necessary historical measurements 41 needed for such techniques or to accurately characterize different combinations of executed computational operations 32.

It will be understood that different computational operations may be independently or collectively monitored according to the techniques described above to provide identical or different processor limit values used to execute a computational operation using the techniques described above. To a first approximation, this may be done by considering that the number of processors used in equation (1) to include processors dedicated to any other computational operation under an assumption that the mix of computational operations will remain relatively static for short periods of time.

The measures derived from the benchmarking routine of an embodiment of the present invention may be used not only to optimize the speed of the execution of the program but to affect other trade-offs in that execution, for example, optimizing a product of processor speed and energy savings, execution throughput, resource usage, or the like, or combinations thereof.

The phrase "serial execution order" refers to the order the parallelized program would execute if not parallelized, and the term "queue" is intended to cover any ordered communication structure including a hardware stack, a linked list, a set of address sequential data, etc. The term "program" is intended to describe collectively all or part of the application programs executing on the computer and should not be construed to suggest a single commercial product but may collectively include multiple programs from different manufacturers, for example.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A method of executing a program on a multiprocessor computer with shared memory, the program comprised at least in part of computational operations of program instructions wherein data accessed by at least one computational operation affects data written by at least one other computational operation, the method comprising steps of:
   (a) measuring a parallel execution of at least a portion of the program with different number of processors executing the program in parallel to provide at least one value related to a speed of execution of the program on a computer;
   (b) adjusting the number of processors executing the program in parallel according to the at least one value; and
   wherein the method includes a step of allocating computational operations of the program to different processors during the parallel execution of the program according to rules preventing conflicts caused by data accesses among the computational operations caused by their parallel execution and wherein step (b) operates during the parallel execution to adjust the number of processors to which the computational operations may be allocated;

wherein the program includes at least one computational operation that may be executed in parallel on the number of processors and a step of measuring execution of the program measures an execution of at least a portion of the computational operations on at least one processor;

wherein the measuring of the parallel execution of the at least a portion of the program monitors a counter near a start and completion of the at least a portion of the program;

wherein the adjusting compares the at least one value to at least two ranges to increase the number of processors executing different portions of the program when at least one value is within first range and decrease the number of processors executing the different portions of the program when at least one value is within second range.

2. The method of claim 1 wherein step (b) includes, at times, reducing the number of processors executing the program to change the at least one value based on a decline of the at least one value.

3. The method of claim 1 wherein the at least one value is at least in part a function of a number of processors executing different computational operations of the program in parallel.

4. The method of claim 3 wherein the at least one value is further a function of a time of the measurement.

5. The method of claim 1 wherein the measuring of a parallel execution and the adjusting of the number of processors is repeated during execution of the program.

6. The method of claim 1 wherein the measuring of a parallel execution measures an execution of the at least a portion of the program on at least one processor when the at least a portion of the program is executed on at least two different numbers of processors in parallel.

7. The method of claim 1 wherein the measuring of a parallel execution of the program derives speed of execution of the program from data selected from the group consisting of data related to cache misses, data related to cache usage, data related to memory traffic, and data related to resource utilization of at least one processor.

8. The method of claim 1 wherein the at least one value indicates a trend in execution time of the at least a portion of the program.

9. The method of claim 1 wherein the measuring of a parallel execution of the program includes the steps of:
 (i) executing the at least a portion of the program on only a single processor to obtain a baseline measure for the portion; and
 (ii) comparing execution measures of the at least a portion of the program during execution on more than one processor to the baseline measure.

10. The method of claim 1 wherein the adjusting further compares the at least one value to a third range to leave the number of processors executing the program unchanged when the at least one value is in the third range.

11. The method of claim 1 wherein the program includes multiple different computational operations that may be executed in parallel on the computer and wherein the measuring an execution of the program measures an execution of a given computational operation on at least one processor when the given computational operation is executed in parallel with different numbers of other computational operations.

12. A computer having multiple processors and shared memory that may execute a stored program in parallel, the stored program comprised at least in part of computational operations of program instructions wherein data accessed by at least one computational operation affects data written by at least one other computational operation, the computer executing an operating program stored in non-transient memory to:
 (a) execute the stored program on different numbers of processors in parallel during a parallel execution;
 (b) measure the execution of at least a portion of the stored program with the different numbers of processors during the parallel execution to provide at least one value related to a speed of execution of the stored program on the computer; and
 (c) adjust the number of processors executing the stored program in parallel according to the at least one value;
 wherein the computer further executes the operating program to allocate computational operations of the stored program to different processors during the parallel execution of the program according to rules preventing conflicts caused by data accesses among the computational operations caused by their parallel execution and wherein the operating program operates step (b) during the parallel execution to adjust the number of processors to which computational operations may be allocated according to the measure of the execution;
 wherein when the stored program includes at least one computational operation that may be executed in parallel on the number of processors, the computer executes the operating program to measure an execution of at least a portion of the at least one computational operation on at least one processor;
 wherein the computer executes the operating program to measure the execution of the at least a portion of the stored program by monitoring a counter near a start and completion of the at least a portion of the stored program; and
 wherein the computer executes the operating program to adjust the number of processors by comparing the at least one value to at least two ranges to increase the number of processors executing different portions of the stored program when at least one value is within first range and decrease the number of processors executing the different portions of the stored program when at least one value is within second range.

13. The computer of claim 12 wherein the computer executes the operating program to at times, reduce the number of processors executing the stored program to change the at least one value based on a decline of the at least one value.

14. The computer of claim 12 wherein the measure of execution of the stored program measures a speed of execution of at least a portion of the stored program and a number of processors executing the stored program in parallel.

15. The computer of claim 12 wherein the computer further operates to repeat the execution of the at least a portion of the stored program with the different numbers of processors and to repeat the adjusting of the number of processor executing the stored program in parallel during the execution of the stored program.

\* \* \* \* \*